(12) United States Patent
Maddox et al.

(10) Patent No.: US 11,314,074 B2
(45) Date of Patent: Apr. 26, 2022

(54) LIGHT DISC MICROSCOPY FOR FLUORESCENCE MICROSCOPES

(71) Applicant: The University of North Carolina at Chapel Hill, Chapel Hill, NC (US)

(72) Inventors: Paul Samuel Maddox, Chapel Hill, NC (US); Tanner Christian Fadero, Chapel Hill, NC (US)

(73) Assignee: THE UNIVERSITY OF NORTH CAROLINA AT CHAPEL HILL, Chapel Hill, NC (US)

( * ) Notice: Subject to any disclaimer, the term of this patent is extended or adjusted under 35 U.S.C. 154(b) by 0 days.

(21) Appl. No.: 16/980,225

(22) PCT Filed: Mar. 12, 2019

(86) PCT No.: PCT/US2019/021839
§ 371 (c)(1),
(2) Date: Sep. 11, 2020

(87) PCT Pub. No.: WO2019/178090
PCT Pub. Date: Sep. 19, 2019

(65) Prior Publication Data
US 2021/0011269 A1    Jan. 14, 2021

Related U.S. Application Data

(60) Provisional application No. 62/641,598, filed on Mar. 12, 2018.

(51) Int. Cl.
*G01N 21/64* (2006.01)
*G02B 21/08* (2006.01)
(Continued)

(52) U.S. Cl.
CPC ....... *G02B 21/084* (2013.01); *G01N 21/6458* (2013.01); *G02B 19/0019* (2013.01);
(Continued)

(58) Field of Classification Search
CPC .............. G02B 21/084; G02B 19/0019; G02B 19/0047; G02B 21/16; G02B 17/00;
(Continued)

(56) References Cited

U.S. PATENT DOCUMENTS 4,199,686 A    4/1980  Brunsting et al.
4,871,249 A   10/1989  Watson
(Continued)

FOREIGN PATENT DOCUMENTS

DE    10 2014 118 025 A1    6/2016
JP       2002-506203 A       2/2002
(Continued)

OTHER PUBLICATIONS

Drechsler et al., "Confocal microscopy with a high numerical aperture parabolic mirror," 2001, Optics Express, vol. 9, No. 12, pp. 637-644. (Year: 2001).*

(Continued)

*Primary Examiner* — Kiho Kim
(74) *Attorney, Agent, or Firm* — Jenkins, Wilson, Taylor & Hunt, P.A.

(57) ABSTRACT

Methods for imaging a sample using fluorescence microscopy, systems for imaging a sample using fluorescence microscopy, and illumination systems for fluorescence microscopes. In some examples, a method includes positioning the sample such that a plane of interest of the sample is coplanar with a focal plane of a detection objective of a microscope. The method includes positioning a paraboloidal mirror around the sample such that a focal point of the paraboloidal mirror is coplanar with the focal plane of the detection objective and the plane of interest of the sample. The method includes directing a beam of annularly collimated excitation light on the paraboloidal mirror to focus a disc of light on the sample and thereby to provide 360 degree (Continued)

lateral illumination of the sample. The method includes imaging the sample through the detection objective.

21 Claims, 6 Drawing Sheets

(51) Int. Cl.
    *G02B 19/00*    (2006.01)
    *G02B 21/16*    (2006.01)
(52) U.S. Cl.
    CPC ......... *G02B 19/0047* (2013.01); *G02B 21/16* (2013.01); *G01N 2021/6463* (2013.01); *G01N 2201/0636* (2013.01)
(58) Field of Classification Search
    CPC ............... G02B 21/10; G01N 21/6458; G01N 2021/6463; G01N 2201/0636
    See application file for complete search history.

(56) References Cited

U.S. PATENT DOCUMENTS

| | | | |
|---|---|---|---|
| 5,293,269 | A | 3/1994 | Burkhart et al. |
| 5,644,400 | A | 7/1997 | Mundt |
| 5,650,877 | A | 7/1997 | Phillips, Jr. et al. |
| 6,088,097 | A | 7/2000 | Uhl |
| 6,819,411 | B1 | 11/2004 | Sharpe et al. |
| 7,166,838 | B1 | 1/2007 | Janik |
| 2001/0028497 | A1 | 10/2001 | Uhl |
| 2001/0040717 | A1 | 11/2001 | Minoura et al. |
| 2003/0137725 | A1 | 7/2003 | Mueller et al. |
| 2005/0006585 | A1 | 1/2005 | Graham et al. |
| 2005/0111084 | A1 | 5/2005 | Mandella |
| 2005/0134841 | A1 | 6/2005 | Vacz-Iravani et al. |
| 2005/0174568 | A1 | 8/2005 | Vaez-Iravani et al. |
| 2006/0146343 | A1 | 7/2006 | Wadman |
| 2006/0239404 | A1 | 10/2006 | Udpa et al. |
| 2006/0290936 | A1 | 12/2006 | Imura et al. |
| 2007/0109633 | A1 | 5/2007 | Stelzer |
| 2007/0153368 | A1 | 7/2007 | Vucinic et al. |
| 2009/0195866 | A1 | 8/2009 | Kawaski et al. |
| 2009/0296087 | A1 | 12/2009 | Dyshkant et al. |
| 2010/0188957 | A1 | 7/2010 | Knittel et al. |
| 2010/0309566 | A1 | 12/2010 | DeWitt et al. |
| 2011/0300490 | A1 | 12/2011 | Rachet et al. |
| 2011/0310393 | A1 | 12/2011 | Smirnov et al. |
| 2012/0043476 | A1 | 2/2012 | Salmelainen |
| 2015/0098126 | A1 | 4/2015 | Keller et al. |
| 2015/0286042 | A1 | 10/2015 | Hilbert et al. |
| 2016/0048014 | A1* | 2/2016 | Knebel .............. G02B 21/0076 348/80 |
| 2016/0123869 | A1 | 5/2016 | Messerschmidt |
| 2016/0139394 | A1 | 5/2016 | Taniguchi et al. |
| 2018/0052186 | A1 | 2/2018 | Su et al. |
| 2019/0196167 | A1 | 6/2019 | Maddox et al. |
| 2019/0219807 | A1 | 7/2019 | Kobayashi |
| 2020/0088982 | A1 | 3/2020 | Jin et al. |
| 2021/0033841 | A1 | 2/2021 | Maddox et al. |

FOREIGN PATENT DOCUMENTS

| | | |
|---|---|---|
| JP | 2015-537236 A | 12/2015 |
| WO | WO 97/12226 | 4/1997 |
| WO | WO 01/61324 A1 | 8/2001 |
| WO | WO 2015/155027 A1 | 10/2015 |
| WO | WO 2018/049306 A1 | 3/2018 |
| WO | WO 2019/178093 A1 | 9/2019 |

OTHER PUBLICATIONS

Office Action for Canadian Application Serial No. 3,035,788 (dated Apr. 8, 2020).
Extended European Search Report for European Application Serial No. 17849706.1 (dated Apr. 7, 2020).
Communication of European publication number and information on the application of Article 67(3) for European Application Serial No. 17849706.1 (dated May 29, 2019).
Notification of Transmittal of the International Search Report and the Written Opinion of the International Searching Authority, or the Declaration for International Application No. PCT/US2019/021842 (dated Mar. 12, 2019).
Fadero et al., "LITE microscopy: Tilted light-sheet excitation of model organisms offers high resolution and low photobleaching," Journal of Cell Biology, pp. 1-14 (Feb. 28, 2018).
International Search Report and Written Opinion of the International Searching Authority for International Application Serial No. PCT/US2017/050914 (dated Dec. 28, 2017).
Golub et al., "Toward the optical "magic carpet": reducing the divergence of a light sheet below the diffraction limit," Optics Letters, vol. 40, No. 21, pp. 5121-5124 (Nov. 1, 2015).
Chen et al., "Lattice light-sheet microscopy: Imaging molecules to embryos at high spatiotemporal resolution," Science, vol. 346, Issue 6208, 13 pages (Oct. 24, 2014).
Huisken et al., "Even fluorescence excitation by multidirectional selective plane illumination microscopy (mSPIM)," Optics Letters, vol. 32, No. 17, pp. 2608-2610 (Sep. 1, 2007).
Hell et al., "Confocal microscopy with an increased detection aperture: type-B 4Pi confocal microscopy," Optics Letters, vol. 19, No. 3, pp. 1-4 (Feb. 1, 1994).
Notification of Transmittal of the International Search Report and the Written Opinion of the International Searching Authority, or the Declaration for International Application Serial No. PCT/US2019/021839 (dated Jun. 26, 2019).
First Office Action for Japanese Patent Application Serial No. 2019-513848 (dated Jan. 12, 2021).
Golub, I., et al., "Toward the optical "magic carpet": reducing the divergence of a light sheet below the diffraction limit," Optics Letters, vol. 40., No. 21, pp. 5121-5124 (Nov. 1, 2015).
Notice of Allowance and Fee(s) Due for U.S. Appl. No. 16/328,710 (dated Apr. 19, 2021).
Office Action for Canadian Patent Application Serial No. 3,035,788 (dated Feb. 2, 2021).
Non-Final Office Action for U.S. Appl. No. 16/328,710 (dated Dec. 15, 2020).
Corrected Notice of Allowability for U.S. Appl. No. 16/328,710 (dated Jul. 27, 2021).
Decision for Rejection for Japanese Patent Application No. 2019-513848 (dated Jul. 6, 2021).
Notice of Allowance and Fee(s) Due for U.S. Appl. No. 16/980,231 (dated Oct. 20, 2021).
Office Action for Canadian Patent Application Serial No. 3,035,788 (dated Oct. 15, 2021).

* cited by examiner

Light "disc" illumination shadowing

Disc

Sheet

LIGHT DISC MICROSCOPY FOR FLUORESCENCE MICROSCOPES

PRIORITY CLAIM

This application claims the benefit of U.S. Provisional Patent Application Ser. No. 62/641,598 filed Mar. 12, 2018, the disclosure of which is incorporated herein by reference in its entirety.

GOVERNMENT INTEREST

This invention was made with government support under Grant Number MCB-1652512 awarded by the National Science Foundation. The government has certain rights in the invention.

TECHNICAL FIELD

This specification relates generally to fluorescence microscopes and more particularly to light disc microscopy for fluorescence microscopes.

BACKGROUND

Light Sheet Fluorescence Microscopy (LSFM) has emerged as a powerful approach to restrict the excitation volume of fluorescence microscopy by forming a thin, pseudo-non-diffracting "sheet" of light. This sheet is typically thinner than the sample so that out-of-focus fluorescence is not generated and photobleaching is significantly reduced. With LSFM, cell biologists have been able to drastically extend the imaging lifetime for their living fluorescent organisms without introducing unnecessary photobleaching of fluorophores or phototoxicity of the sample.

One current obstacle in LSFM that limits the quality of the images generated (qualitative information) as well as the ability to quantify fluorescence signal with high accuracy (quantitative information) is the problem of "shadowing." This problem of shadowing comes from the optically inconsistent path that the excitation light must take through the sample. For example, if an optically dense structure absorbs, scatters, or refracts light from the light sheet, then structures that lie further down the path of light "behind" the first structure will experience less intense illumination than other nearby structures. This shadowing effect creates striping patterns along the sample that make quantifying fluorescence intensity in different stripes difficult.

Several solutions that mitigate the striping artifacts have been presented in the literature, such as rapidly dithering the sheet to taper shadows over a single exposure, using "self-healing" Bessel Beams that have naturally tapered shadows (1), or using multiple co-planar light sheets that stochastically illuminate each others' shadowed areas (2). Practical examples of the latter shadow correction technique include microscopes with two, four, and even six co-planar light sheets. The shadowing is reduced with the addition of each coplanar light sheet. The drawback to introducing more co-planar light sheets is that the alignment of multiple sheets becomes more complicated. Additionally, there is a practical limit to the number of light sheets that can be introduced with cylindrical lens-type objective elements, since each light sheet requires a separate lens.

SUMMARY

This specification describes a solution for introducing a theoretically infinite number of coplanar light sheets to reduce shadowing in LSFM to a theoretical minimum. This illumination scheme can be achieved with a single optical element (a paraboloidal mirror) rather than multiple independently positioned cylindrical lenses. In some examples, a method includes positioning a sample such that a plane of interest of the sample is coplanar with a focal plane of a detection objective of a microscope. The method includes positioning a paraboloidal mirror around the sample such that a focal point of the paraboloidal mirror is coplanar with the focal plane of the detection objective and the plane of interest of the sample. The method includes directing a beam of annularly collimated excitation light on the paraboloidal mirror to focus a disc of light on the sample and thereby to provide 360 degree lateral illumination of the sample. The method includes imaging the sample through the detection objective.

DESCRIPTION

This specification describes methods for imaging a sample using fluorescence microscopy, systems for imaging a sample using fluorescence microscopy, and illumination systems for fluorescence microscopes.

Figure 1:
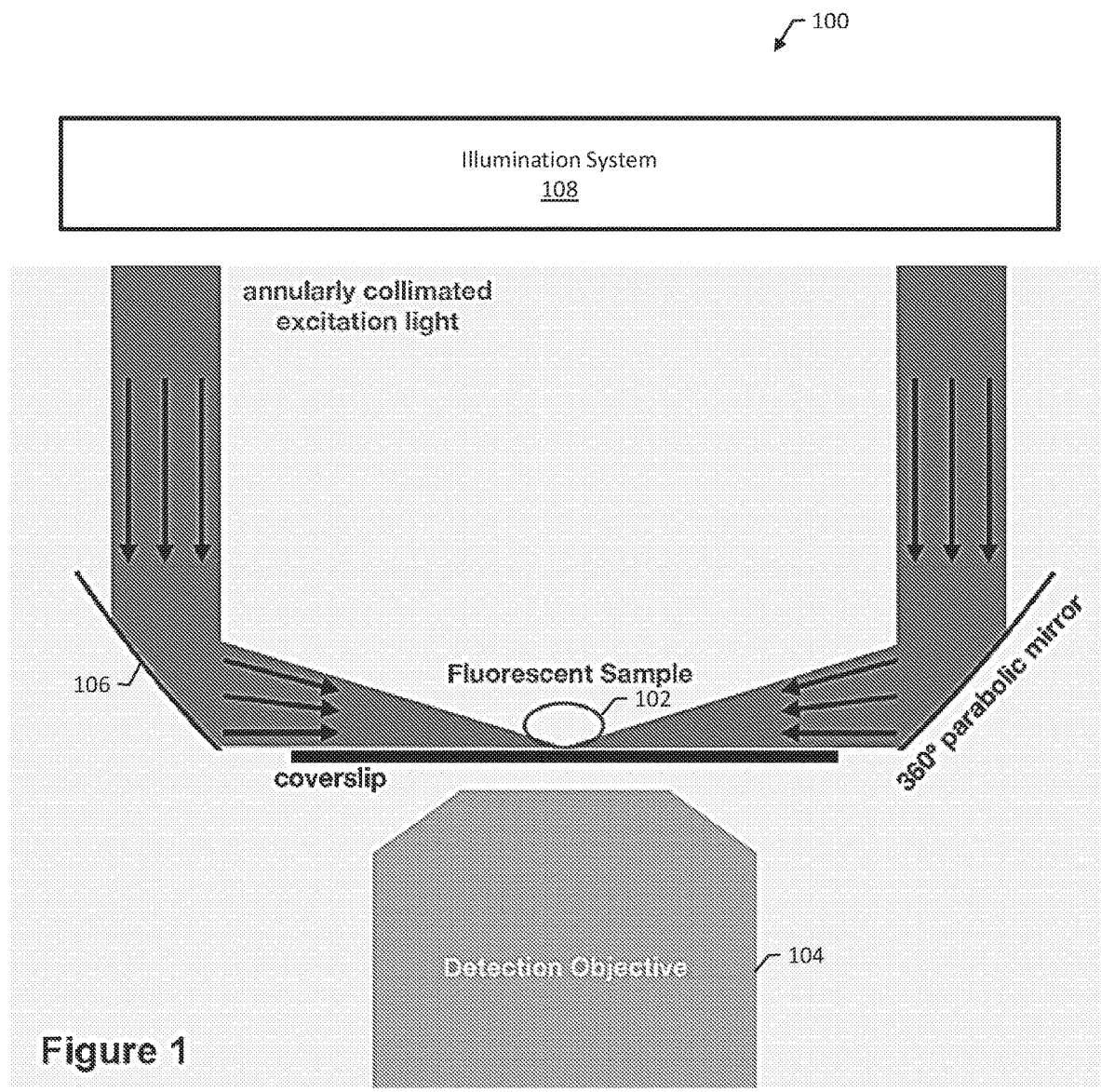
FIG. 1 is a diagram of an example system for imaging a sample using fluorescence microscopy.

FIG. 1 is a diagram of an example system 100 for imaging a sample 102 using fluorescence microscopy. System 100 includes a detection objective 104 of a microscope. Sample 102 is positioned, e.g., on a coverslip, such that a plane of interest of sample 102 is coplanar with a focal plane of detection objective 104. System 100 includes a paraboloidal mirror 106 oriented around sample 102 such that a focal point of paraboloidal mirror 106 is coplanar with the focal plane of detection objective 104 and the plane of interest of sample 102. System 100 includes an illumination system 108 configured for directing a beam of annularly collimated excitation light on paraboloidal mirror 106 to focus a disc of light on sample 102 and imaging sample 102 through detection objective 104.

FIG. 1 shows one potential arrangement in which a paraboloidal mirror can direct a beam of annularly collimated excitation light over a coverslip to focus to a diffraction-limited "sheet" in the fluorescent sample, which is then imaged by a detection objective. The curved nature of the paraboloidal mirror allows any collimated light parallel to its optical axis to focus to a point. The paraboloidal mirror should be positioned such that its focal point is coplanar with the detection objective focal plane. In order to view the sample, it should also be positioned such that the plane of interest is coplanar with the detection objective focal plane.

Figure 2:
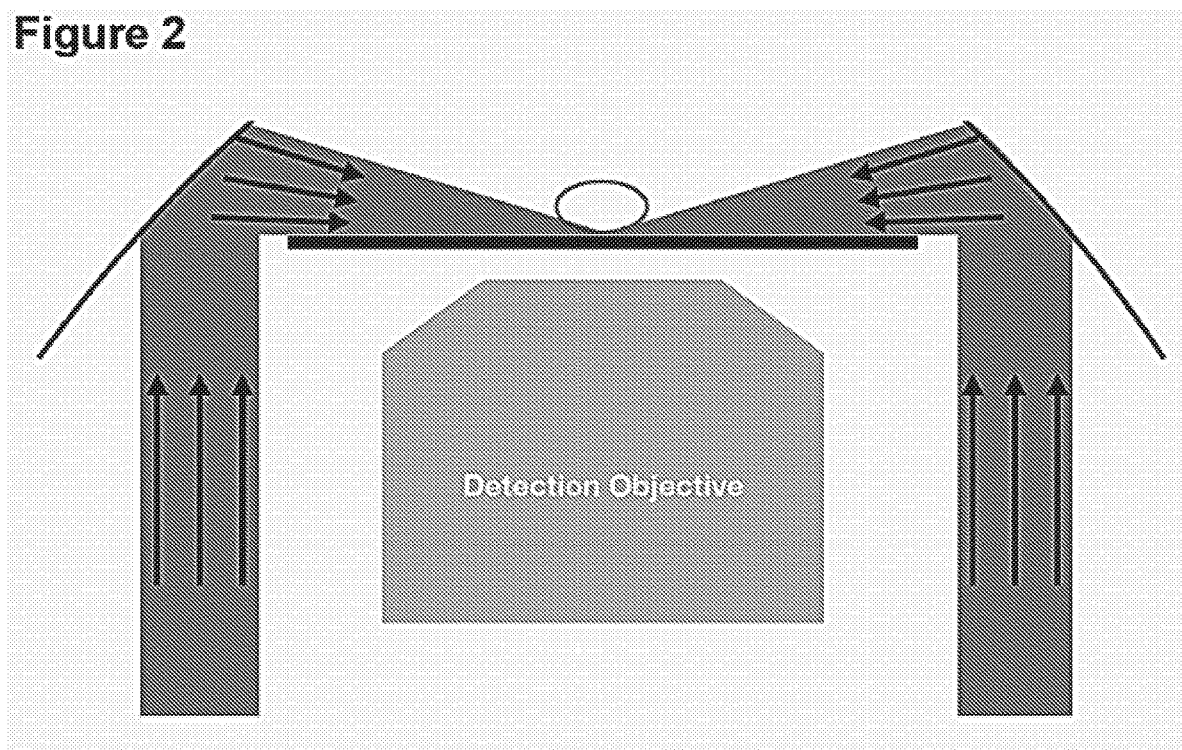
FIG. 2 is a diagram of an example system with a paraboloidal mirror mounted antiparallel to the detection objective.

In order to be compatible with detection objectives of a high numerical aperture (NA) that require coverslips, the excitation light must not intersect the glass coverslip before it reaches the sample. Accordingly, the annularly collimated excitation light must be focused such that the marginal ray closest to the coverslip travels parallel to the coverslip. This can be theoretically accomplished with a paraboloidal mirror mounted parallel to the detection objective (FIG. 1) or antiparallel to the detection objective (FIG. 2). FIG. 2 is a diagram of an example system with a paraboloidal mirror mounted antiparallel to the detection objective.

Effectively, every one of the infinite number of coplanar light sheets needs to be tilted relative to the detection objective focal plane. The calculations for the angle at which these sheets need to be tilted was first described by Fadero et al. in 2018 (3); this calculation can easily be applied to a paraboloidal-generated light sheet as well.

By changing the thickness of the annularly collimated excitation light, it is possible to adjust the effective tilt angle of the converging beam over the coverslip. For example, increasing the thickness of the collimated light will proportionally increase the convergence angle of the focused light, and vice-versa. This method of illumination cannot be performed at a tilt angle of 0° with an objective that requires a coverslip. Fadero et al. (2018) describe the spatial dimensions (length, width) and tilt angle for a light sheet that is optimized for any given detection objective (3). As long as the tilt angle is greater than or equal to this non-zero value described by Fadero et al. (3), this setup is compatible with any detection objective.

Figure 3:
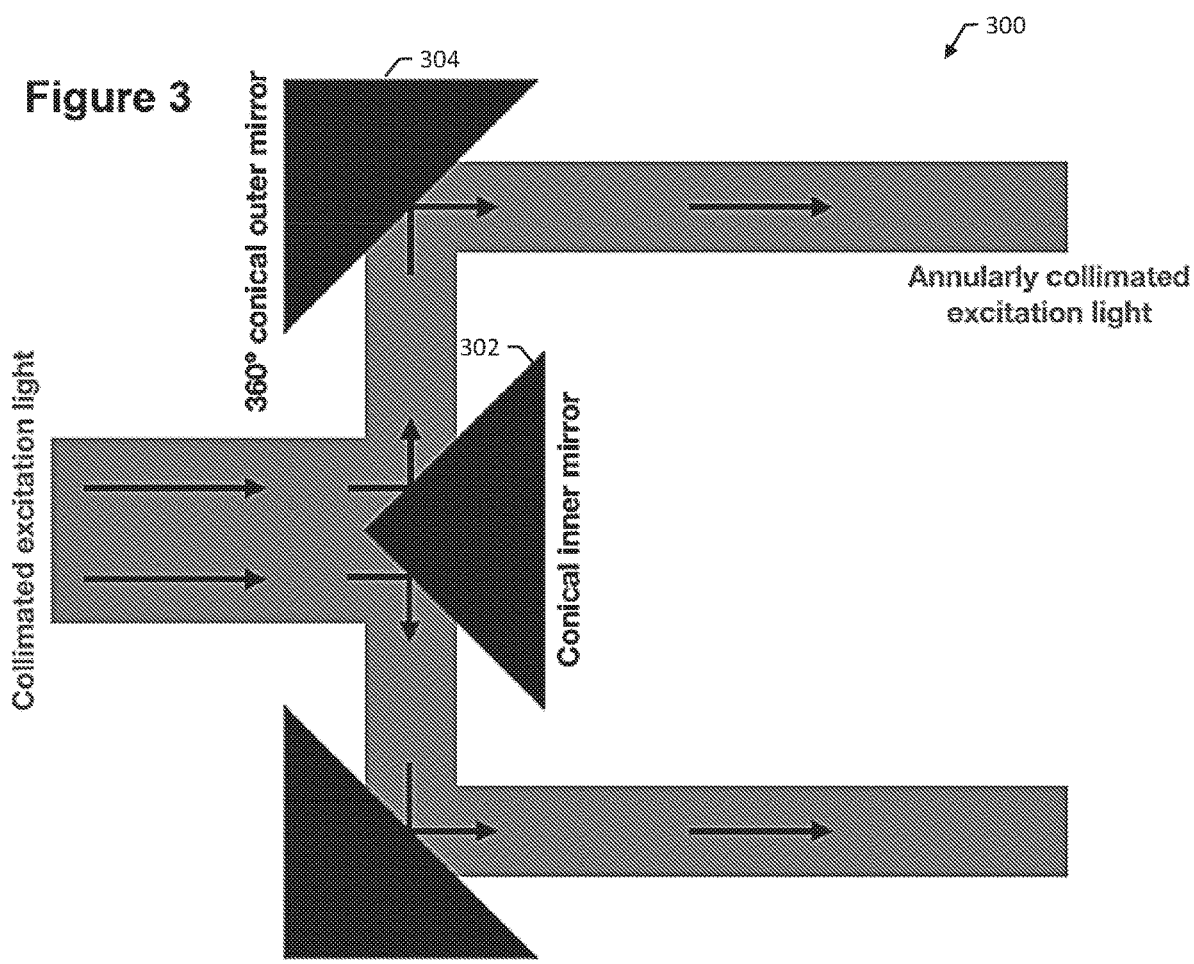
FIG. 3 is a diagram of an example illumination system for a fluorescence microscope.

In order to generate an annularly collimated beam efficiently, we propose using the technique described in FIG. 3 involving two conical mirrors.

FIG. 3 is a diagram of an example illumination system 300 for a fluorescence microscope. System 300 includes a conical inner mirror 302 and a conical outer mirror 304. Conical inner mirror 302 and conical outer mirror 304 can be used with a paraboloidal mirror (e.g., paraboloidal mirror 106 of FIG. 1) to image a sample. System 300 can include a structure, e.g., a motion stage or other appropriate apparatus, for positioning conical inner mirror 302 at a center of a collimated excitation beam so that excitation light is symmetrically reflected at every angle about conical inner mirror 302, and positioning conical outer mirror 304 to be centered around conical inner mirror 302 such that the excitation light that is symmetrically reflected from conical inner mirror 302 is reflected by conical outer mirror 304 into a beam of annularly collimated excitation light directed at the paraboloidal mirror. In some examples, the structure is configured for positioning the paraboloidal mirror around a sample such that a focal point of the paraboloidal mirror is coplanar with a focal plane of a detection objective of a microscope and a plane of interest of the sample.

The conical mirrors are symmetric about the excitation light propagation axis and act as non-focusing mirrors so that the light remains collimated. The conical inner mirror has a half-angle of 45° such that any collimated light incident upon it reflects at an angle of 90°. The conical inner mirror should be positioned at the center of the collimated excitation beam so that the light is symmetrically reflected at every angle. The light is then reflected a second time by a conical outer mirror centered about the conical inner mirror.

The outer mirror is a hollow cone of reflective material with a half angle of 45°. The inner and outer mirrors need not have half angles of precisely 45°; rather, the half angles of the conical mirrors should be complementary to each other (i.e. their sum is equal to 90°). The complementary angles ensure that the final annulus generated is not diverging. This annulus should then be incident upon the aforementioned paraboloidal focusing mirror.

Figure 4:
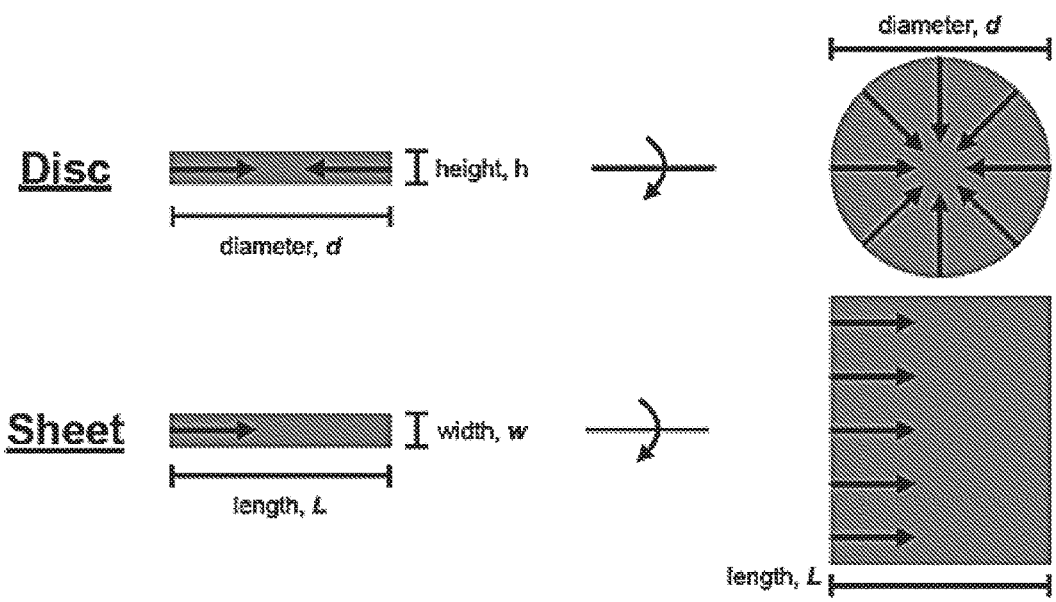
FIG. 4 is a diagram illustrating illumination by a thin "disc" of light.

FIG. 4 is a diagram illustrating illumination by a thin "disc" of light. The nature of the focused sheets from a focusing paraboloidal mirror theoretically forms a thin "disc" of light, rather than a thin sheet from a single focusing lens. This is because an infinite number of radially symmetric sheets focusing to the same point result in a diffraction-limited profile with a constant height (h) and a symmetric diameter (d), which are respectively analogous to the width (w) and length (L) of a light sheet. Side views of the disc and sheet are shown on the left of FIG. 4. From this angle, the disc and sheet are identical.

A rotated view into the plane of the page reveals that the lateral (X/Y) dimensions of the disc are different than those of the sheet, because all light converges to (and diverges from) the center. Because the converging light originated from a single coherent beam, the light will form a coherent disc shape at the focal point of the paraboloidal mirror, with dimensions (h and d) described by the same formulae outlined for light sheet dimensions in Fadero et al. (2018) (3).

Figure 5:
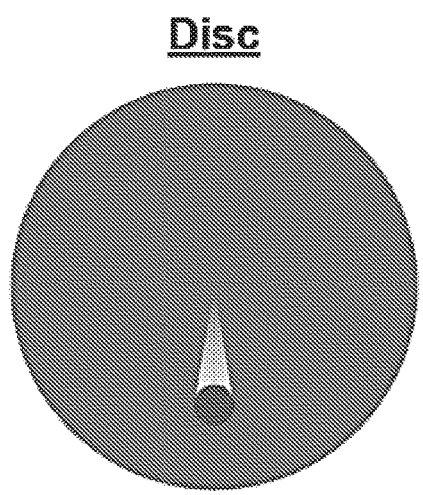
FIG. 5 is a diagram illustrating light disc illumination shadowing.
Figure 5:
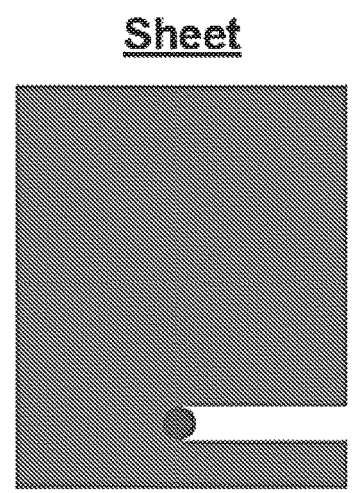

FIG. 5 is a diagram illustrating light disc illumination shadowing. The disc will also have a minimum amount of shadowing, as shown by the optically dense objects in FIG. 5 that block light. This reduction in shadowing occurs because every point within the disc is illuminated equally from all horizontal angles. Previous LSFM systems can approximate this disc with a finite number of coplanar light sheets, but only with an infinite number of coplanar light sheets will a light disc form, with which shadowing can be reduced to its theoretical minimum.

This technology is broadly applicable to all users of fluorescence microscopy, as it is a form of LSFM compatible with any detection objective. It is of particular significance to live-cell fluorescence imaging, as the light disc can reduce out-of-focus fluorescence signal and reduce photobleaching/phototoxicity; however, the technology can be used on any appropriate type of samples, including fixed samples. It is even more applicable as a notable improvement to the current implementations of LSFM, as the minimal shadowing will maximize the quality of LSFM images as well as their quantitative information.

Figure 6:
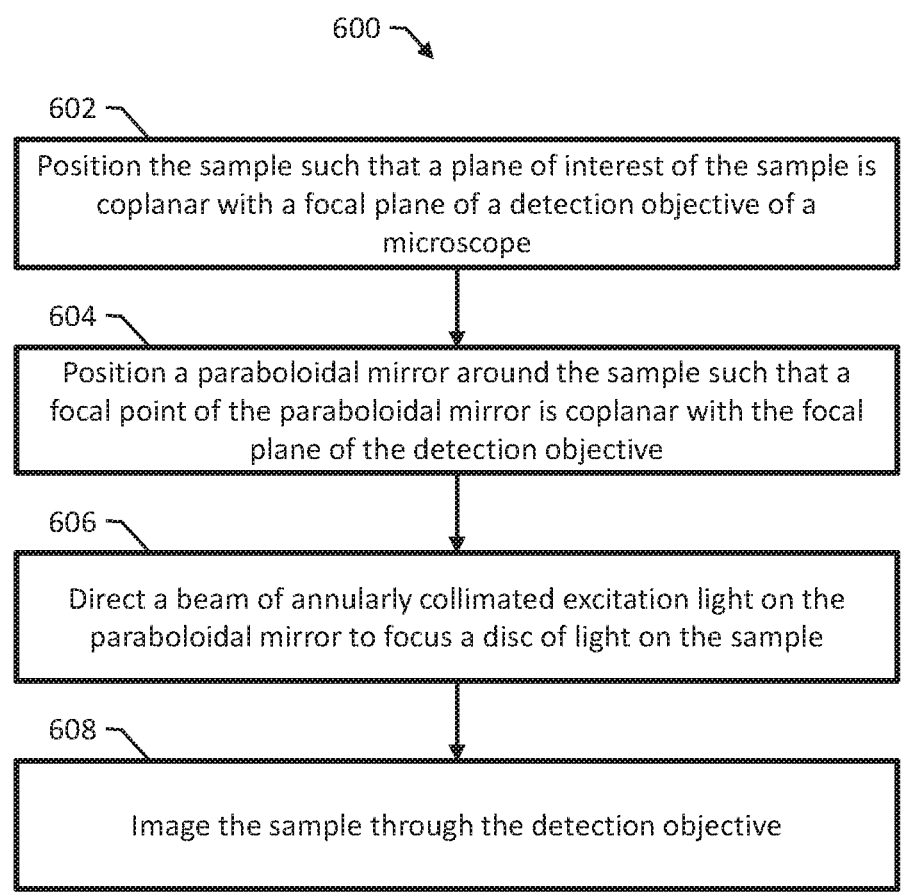
FIG. 6 is a flow diagram of a method for imaging a sample using fluorescence microscopy.

FIG. 6 is a flow diagram of a method 600 for imaging a sample using fluorescence microscopy. The method 600 includes positioning the sample such that a plane of interest of the sample is coplanar with a focal plane of a detection objective of a microscope (602). The method 600 includes positioning a paraboloidal mirror around the sample such that a focal point of the paraboloidal mirror is coplanar with the focal plane of the detection objective and the plane of interest of the sample, e.g., as described above with reference to FIGS. 1-2 (604). The method 600 includes directing a beam of annularly collimated excitation light on the paraboloidal mirror to focus a disc of light on the sample, e.g., as described above with reference to FIG. 3 (606). The method 600 includes imaging the sample through the detection objective (608).

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

REFERENCES

Each of the following references is hereby incorporated by reference in its entirety.
1. Chen, B. C., W. R. Legant, K. Wang, L. Shao, D. E. Milkie, M. W. Davidson, C. Janetopoulos, X. S. Wu, J. A. Hammer III, Z. Liu, et al. 2014. Lattice light-sheet microscopy: Imaging molecules to embryos at high spatiotemporal resolution. Science. 346:1257998. doi: 10.1126/science.1257998
2. Huisken, J. and Stainier, D. Y. R. 2007. Even fluorescence excitation by multidirectional selective plane illumination microscopy (mSPIM). *Optics Lett.* 32 (17), 2608-2610.
3. Fadero, T. C., Gerbich, T. M., Rana, K., Suzuki, A., DiSalvo, M., Schaefer, K. N., Heppert, J. K., Boothby, T. C., Goldstein, B., Peifer, M., Allbritton, N. L., Gladfelter, A. S., Maddox, A. S., and Maddox, P. S. 2018. LITE microscopy: Tilted light-sheet excitation of model organisms offers high resolution and low photobleaching. *Journ. Cell Biol.* DOI: 10.1083/jcb.201710087

What is claimed is:

1. A method for imaging a sample using fluorescence microscopy, the method comprising:
   positioning the sample such that a plane of interest of the sample is coplanar with a focal plane of a detection objective of a microscope;
   positioning a paraboloidal mirror around the sample such that a focal point of the paraboloidal mirror is coplanar with the focal plane of the detection objective and the plane of interest of the sample;
   directing a beam of annularly collimated excitation light on the paraboloidal mirror to focus a disc of light on the sample and thereby to provide 360 degree lateral illumination of the sample; and
   imaging the sample through the detection objective.

2. The method of claim 1, wherein directing the beam of annularly collimated excitation light comprises setting a thickness of the beam of annularly collimated excitation light such that a propagation axis of each coplanar light sheet reflected by the paraboloidal mirror is at an oblique angle relative to the focal plane of the detection objective.

3. The method of claim 2, wherein setting the thickness of the beam of annularly collimated excitation light comprises increasing the thickness of the beam of beam of annularly collimated excitation light to increase a convergence angle of each coplanar light sheet or decreasing the thickness of the beam of annularly collimated excitation light to decrease the convergence angle of each coplanar light sheet.

4. The method of claim 2, wherein the detection objective has a numerical aperture greater than or equal to 1.4, wherein the sample is mounted on a glass coverslip, and wherein setting the thickness of the beam of annularly collimated excitation light comprises setting the thickness of the beam of annularly collimated excitation light such that the excitation light does not intersect the glass coverslip before it reaches the sample.

5. The method of claim 1, wherein directing the beam of annularly collimated excitation light comprises directing a collimated excitation beam onto a conical inner mirror positioned at a center of the collimated excitation beam so that excitation light is symmetrically reflected at every angle about the conical inner mirror.

6. The method of claim 5, wherein directing the beam of annularly collimated excitation light comprises positioning a conical outer mirror to be centered around the conical inner mirror such that the excitation light that is symmetrically reflected from the conical inner mirror is reflected by the conical outer mirror into the beam of annularly collimated excitation light.

7. The method of claim 6, wherein the conical outer mirror is a hollow cone of reflective material, and wherein a half angle of the conical outer mirror is complementary to a half angle of the conical inner mirror.

8. The method of claim 1, wherein positioning the paraboloidal mirror comprises mounting the paraboloidal mirror parallel or antiparallel to the detection objective.

9. The method of claim 1, wherein imaging the sample comprises observing the sample by eye or camera, using pre-existing light paths within a standard upright or inverted research-grade microscope.

10. The method of claim 1, wherein imaging the sample comprises performing live-cell fluorescence imaging.

11. A system for imaging a sample using fluorescence microscopy, the system comprising:
    a detection objective of a microscope and a sample positioned such that a plane of interest of the sample is coplanar with a focal plane of the detection objective;
    a paraboloidal mirror oriented around the sample such that a focal point of the paraboloidal mirror is coplanar with the focal plane of the detection objective and the plane of interest of the sample; and
    an illumination system configured for directing a beam of annularly collimated excitation light on the paraboloidal mirror to focus a disc of light on the sample and imaging the sample through the detection objective.

12. The system of claim 11, wherein directing the beam of annularly collimated excitation light comprises setting a thickness of the beam of annularly collimated excitation light such that a propagation axis of each coplanar light sheet reflected by the paraboloidal mirror is at an oblique angle relative to the focal plane of the detection objective.

13. The system of claim 12, wherein setting the thickness of the beam of annularly collimated excitation light comprises increasing the thickness of the beam of beam of annularly collimated excitation light to increase a convergence angle of each coplanar light sheet or decreasing the thickness of the beam of annularly collimated excitation light to decrease the convergence angle of each coplanar light sheet.

14. The system of claim 13, wherein the detection objective has a numerical aperture greater than or equal to 1.4, wherein the sample is mounted on a glass coverslip, and wherein setting the thickness of the beam of annularly collimated excitation light comprises setting the thickness of the beam of annularly collimated excitation light such that the excitation light does not intersect the glass coverslip before it reaches the sample.

15. The system of claim 11, wherein directing the beam of annularly collimated excitation light comprises directing a collimated excitation beam onto a conical inner mirror positioned at a center of the collimated excitation beam so that excitation light is symmetrically reflected at every angle about the conical inner mirror.

16. The system of claim 15, wherein directing the beam of annularly collimated excitation light comprises positioning a conical outer mirror to be centered around the conical inner mirror such that the excitation light that is symmetrically reflected from the conical inner mirror is reflected by the conical outer mirror into the beam of annularly collimated excitation light.

17. The system of claim 16, wherein the conical outer mirror is a hollow cone of reflective material, and wherein a half angle of the conical outer mirror is complementary to a half angle of the conical inner mirror.

18. The system of claim 11, wherein positioning the paraboloidal mirror comprises mounting the paraboloidal mirror parallel or antiparallel to the detection objective.

19. The system of claim 11, wherein imaging the sample comprises observing the sample by eye or camera, using pre-existing light paths within a standard upright or inverted research-grade microscope.

20. The system of claim 11, wherein imaging the sample comprises performing live-cell fluorescence imaging.

21. An illumination system for a fluorescence microscope, the illumination system comprising:
- a paraboloidal mirror;
- a conical inner mirror;
- a conical outer mirror; and
- a structure for positioning the conical inner mirror at a center of a collimated excitation beam so that excitation light is symmetrically reflected at every angle about the conical inner mirror, positioning the conical outer mirror to be centered around the conical inner mirror such that the excitation light that is symmetrically reflected from the conical inner mirror is reflected by the conical outer mirror into a beam of annularly collimated excitation light directed at the paraboloidal mirror, and positioning the paraboloidal mirror around a sample such that a focal point of the paraboloidal mirror is coplanar with a focal plane of a detection objective of a microscope and a plane of interest of the sample.

* * * * *